No. 884,561.
PATENTED APR. 14, 1908.
W. S. BOWNESS.
AUTOMATIC HOSE UNCOUPLING.
APPLICATION FILED JUNE 3, 1907.
2 SHEETS—SHEET 1.
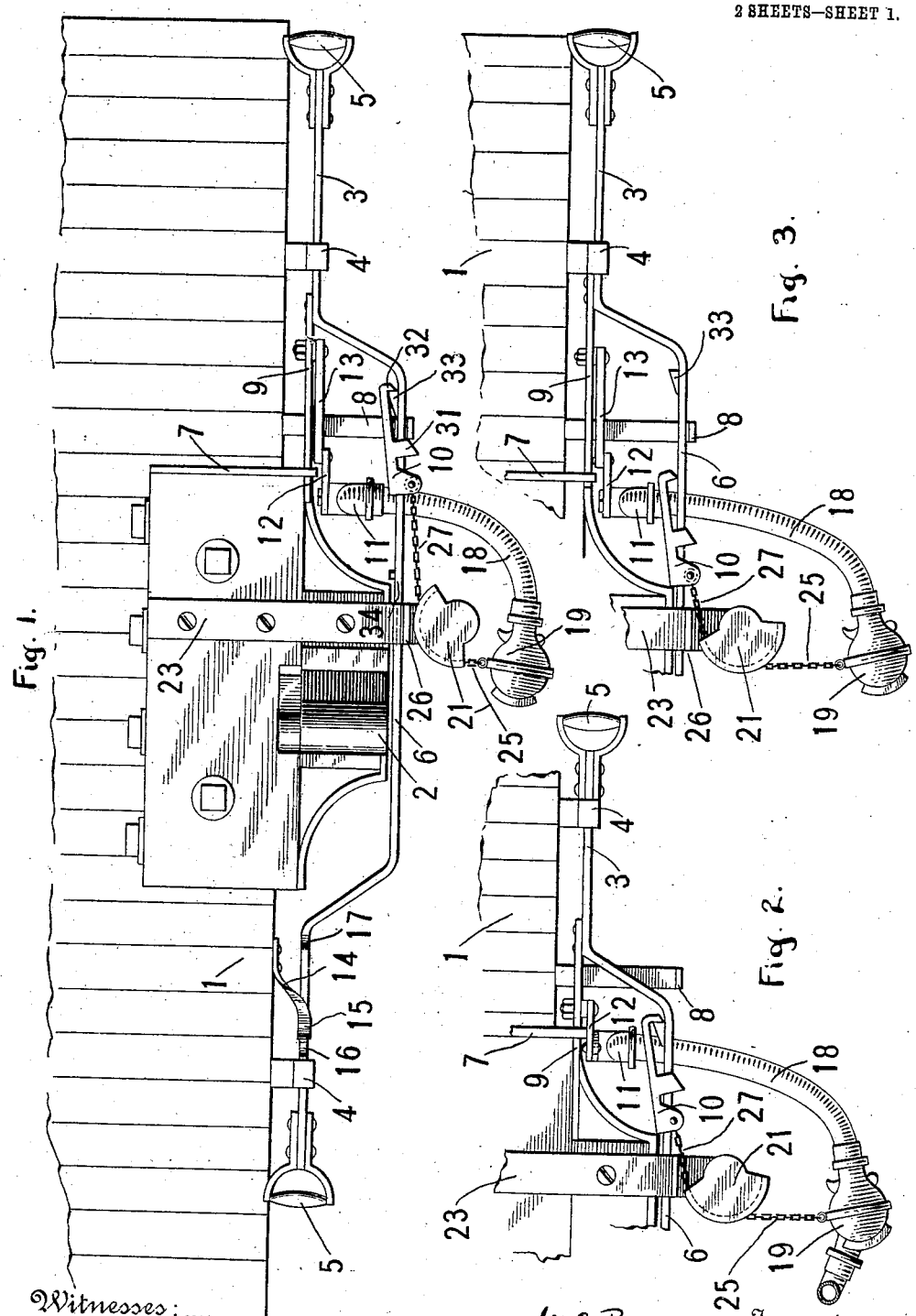
Witnesses:
Margaret H. Nathan
Elliott W. Hazzard
W. S. Bowness Inventor
By Attorney Albert Nathan

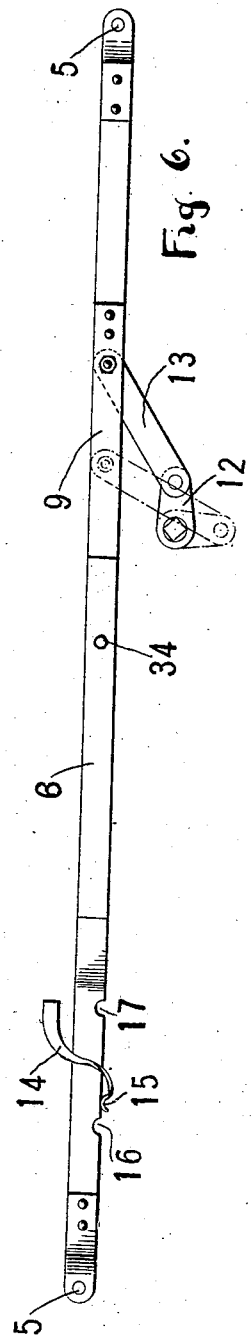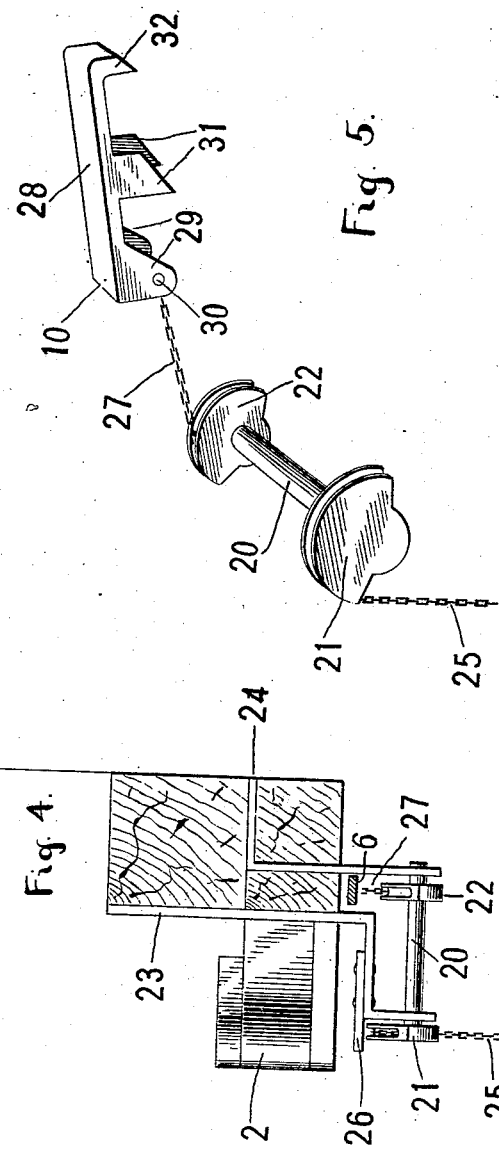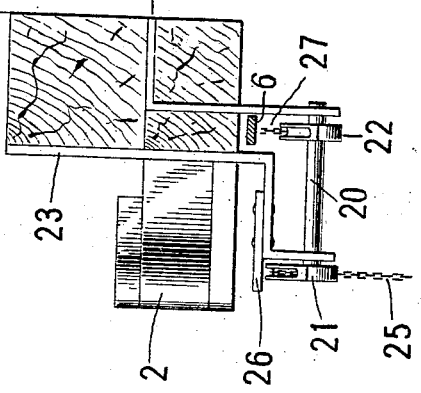

UNITED STATES PATENT OFFICE.

WALTER S. BOWNESS, OF MONCTON, NEW BRUNSWICK, CANADA.

AUTOMATIC HOSE-UNCOUPLING.

No. 884,561.            Specification of Letters Patent.            Patented April 14, 1908.

Application filed June 3, 1907. Serial No. 376,940.

*To all whom it may concern:*

Be it known that I, WALTER S. BOWNESS, a subject of the King of Great Britain, residing at Moncton, Province of New Brunswick, Dominion of Canada, have invented certain new and useful Improvements in Automatic Hose-Uncouplers, of which the following is a full, clear, and exact specification.

This invention relates broadly to railroad safety devices adapted to disengage the connected ends of air hose on coupled cars by an operation either purely automatic in character or in part manually controlled, but more specifically it relates to means for disconnecting air hose supplied with couplings of the conventional type by effecting an elevation of the union therebetween. Since, however, certain advantages characteristic of this invention prominently appear when it is resorted to for the purpose of enabling the uncoupling operation to be manually carried out and with a concomitant and automatic stoppage of the air-flow, it will be conducive to clearness to disclose it through one of the various possible simple embodiments thereof.

Heretofore the uncoupling of the air hose in railway service has been accomplished only with considerable difficulty, and this operation has very frequently been attended with injury and in many cases actual loss of life to trainmen. This is due to the fact that practical working conditions have rendered it necessary for the trainmen to step between the adjacent cars in order to gain access to the air hose and enable it to be raised by hand, and as will be readily perceived he is very likely to become caught between or thrown under the wheels of the moving cars since he is obliged to assume a crouching attitude between the rails and partly under the draw bar. In an effort to so far as possible obviate this, the air hoses have heretofore been provided with couplers which will automatically disengage when elevated and it has been proposed to bring about this elevation by the mere separation of the cars, but it has also been found in practice that the air hoses are frequently torn apart unless preliminarily manually disengaged, and often an occurrence of this nature not only renders inoperative the entire air brake system, but involves great expense and inconvenience.

One object residing within the contemplation of this invention is to devise a simple means for satisfactorily and positively elevating the connecting ends of said hose without bringing tensional strains on said hose for the purpose of effecting their separation.

Another object is to do this and at the same time positively cut off the flow and escape of air through said hose so that the air brakes may not be unintentionally applied by reason of the uncoupling operation.

Another object is to provide a means adapted to simultaneously elevate the free end of an air hose, cut off the escape of air therefrom if necessary, and then at once permit the free end to return to its normal position without again opening the valve.

Another object is to provide a means for either manually or automatically elevating the free end of the air hose through the instrumentality of a flexible connection extending from said air hose at or adjacent the free end thereof whereby the latter may be freely manipulated by the trainman and coupled to a companion hose without interference from the disconnecting means.

Another object is to devise an elevating means having a chain attached to the free end of the air hose and capable of elevating said end when the cars are being separated and of lowering said end when the cars are being coupled.

Another object is to devise a safety device of the foregoing character and functions which is adapted for immediate application to existing car systems without involving alterations or changes and without requiring more than ordinary skill in so doing.

Other objects and advantages will be in part obvious from the annexed drawings and in part pointed out in the following description.

In general, this invention seeks to provide a means of the class described which from a mechanical standpoint will in practical usage possess a high degree of effectiveness, and which structurally considered will be of the greatest possible simplicity, and be composed of but few parts each capable of being manufactured at a minimum of cost and so corelated as to be capable of being very readily assembled by an ordinary worker in the art to accomplish the purposes intended.

The invention accordingly consists in the features of construction, combination of elements and arrangement of parts which will be exemplified by the embodiment herein set forth and defined as to scope and application by the prior art after the manner indicated in the following claims.

In order that this invention may be more fully understood and made comprehensible to others skilled in its relating arts, drawings illustrating one only of the various possible applications of the same are appended as part of the specification and while the controlling features of the invention may be otherwise applied by modifications falling within the intended scope of the claims, the herein disclosed embodiment is that which will ordinarily be resorted to in practice, and is regarded as representing substantial improvements over many of the obvious and implied variations of the same.

In the appended drawings, corresponding parts are similarly referred to by like characters of reference throughout all the figures of which:

Figure 1 is an end elevation showing the general arrangement and relationship of the various parts of this invention with reference to one another and to the body of a car to which it is applied, and showing the position assumed by the parts immediately after operating the invention for the purpose of uncoupling the air hose and before the free end of the hose has been allowed to return to its lower normal position, the valve is here closed. Fig. 2 is a like view showing the position of the parts of the invention preparatory to operating it for the purpose of uncoupling the air hose, the valve is here open. Fig. 3 is a like view showing the arrangement of the parts of this invention after the air hose has returned to its normal disconnected position, the valve is here closed. Fig. 4 is a cross sectional fragmentary detailed view of one of the many possible mechanical expedients which may be resorted to for the purpose of properly transmitting the motion of the hand levers to the free end of the air hose. Fig. 5 is a detailed perspective showing the same, and also showing one form of automatic means for enabling the free end of the air hose to return to its normal position after having been uncoupled from its companion. Fig. 6 is a detailed view of the actuating bar showing its connection to the valve controlling the flow of air through the air hose and showing the resilient means for yieldably retaining the bar in any one of a plurality of predetermined positions.

Referring now to the accompanying drawings, 1 indicates a body of an ordinary freight car which is provided with any suitable car coupling means 2, mounted on the car body through the agency of the deadwood. As will be readily perceived, this invention is applicable to various types of cars, and therefore the illustration of the foregoing parts is to be regarded as purely conventional in nature and in the shown specific and exact form not necessarily incidental to this invention.

Carried by the car body is an actuating member 3, which is here shown to be so mounted as to be capable of a motion of translation, although as will be perceived by those skilled in this art, this member may, in other embodiments of this invention, have a motion of revolution or in fact may possibly have a compound movement according to the preferred form of construction. In the shown embodiment, which here it may be stated is regarded in many respects the preferable one, the actuating member consists of an elongated bar of flat iron mounted in suitable guides or slide bearings 4, depending from the under side of the car adjacent each side thereof. For the sake of convenience, the actuating bar 3 is at each end provided with a handle 5 so that the same may readily be operated manually, and its intermediate portion 6 is depressed so as to take under the deadwood and otherwise properly conform to the construction of the ordinary car.

To further steady and enable the actuating member to more freely reciprocate, the herein illustrated embodiment of this invention also provides auxiliary supports 7 and 8, the former consisting of a piece or strip of iron or other suitable material attached to the side of the deadwood and having its lower end slotted or otherwise adapted to carry an extension 9 from the actuating member. It will of course, be readily perceived that the extension may be integral with the actuating bar, or it may be riveted or otherwise suitably affixed thereto, as the preference may be, this being merely a matter of mechanical expediency. The guide 8 may have an analogous function, but in the shown form it also has another purpose in that it primarily serves as a trip for the automatic shoe 10 whose operation will later be more specifically set forth.

11 denotes a valve, or angle cock, as it is commonly termed in the art, in the air pipe for controlling the flow of air through the same, and 12 indicates a handle extending from such valve which serves to operate the same. Pivoted to the outer end of said valve handle, and to the extension 9 from the actuating member, is a link 13; the parts being so disposed that the valve may be opened and closed by a corresponding reciprocation of the actuating member. This is shown more clearly by Fig. 6, which in full lines shows the disposition of the parts when the valve is closed. In dotted lines is shown the arrangement of the parts when the valve is open. It may here be noted that it is desirable that the actuating member may be positively held in either its open or closed position so that an inadvertent or accidental contrary movement may not readily take place, and to this end I have provided said member with a spring 14 which at one end is secured to the car body, and at the other end is provided with a rounded tip as shown by 15, so that it may take into the coöperating notches 16 and 17 as the case may be.

I will now describe the instrumentality whereby the free end of the air hose 18 provided with a coupler 19, of any approved type may be raised or lowered. The coupler 19 is of any of the well known conventional types which interlock with a companion or complementary coupler when in a lowermost position, and which automatically disengages from such companion when elevated as shown by Fig. 1. To accomplish this elevation, this invention proposes a flexible connection extending from the end of the hose and adapted to be withdrawn at will through the agency of the actuating member 3. The shown expedient comprises a shaft 20 (see Figs. 4 and 5) carrying at one end a segmental pulley 21 and at the other a segmental pulley 22. This pullied shaft may be mounted in any manner desired as by means of an angle iron 23 attached to the deadwood, and having its lower end extending forwardly and downwardly, to form the front bearing. The rear bearing may also consist of an angle piece 24 which depends from the deadwood. A flexible connection such as a chain 25 extends from the coupling 19 and rides over the segmental pulley 21 and to prevent the chain from getting out of the groove in said pulley, this invention provides a cap piece 26 which extends from the angle iron 23 adjacent to and over said groove. A flexible chain 27 rides over the rear segmental pulley 22 and at its end is attached to the automatic hook or shoe 10. The latter consists of a body portion 28 having rear ears 29 laterally depending and connected by means of a pin 30 which may be engaged by the chain 27, and which serves to hold the hook or shoe on the actuating member. Guides 31 may also be provided for the purpose of maintaining said hook in operative position with respect to said member, and the forward end of said hook depends and forms a latch 32, adapted to be engaged by a coöperating stud 33 secured to the actuating member. The latter may also be provided with a stop 34 for limiting the movement of said hook.

The operation of this invention, while largely obvious from the foregoing description, may be briefly stated as follows. Assume the parts to be in the position shown by Fig. 2 in which the air hose is in a lowermost coupled position and that the train man desired to uncouple such hose. He will grasp the handle at the end of the car and pull it laterally. This moves the stud 33 laterally, causing it to engage and carry along for a short distance the shoe 10. The flexible connection extending from the shoe 10 to the end of the air hose raises and uncouples the same during this lateral movement. Simultaneously with this raising and concomitant uncoupling of the air hose, the valve 11 will be closed, thus cutting off the flow of air to the air hose. Up to this point, the action has been largely manually controlled, but, an automatic action takes place forthwith, that is to say, as the parts moved by the handle approach their limit of movement, the shoe 10 becomes disengaged from the latch 33 and the end of the air hose is dropped to its lowermost position and is then ready to be again coupled to its companion. When the air hose is coupled to its companion, the trainman will now push the member at the end of the car into its normal position, thus again opening the air valve and freeing the brakes.

It will be seen that the invention is one well adapted to attain the ends and objects aforesaid. In character it is simple and inexpensive, and it is capable of application to existing structures without difficulty or involving a reorganization of adopted arrangements.

As many changes could be made in the above construction, and many apparently widely different embodiments of this invention could be made without departing from the scope thereof, it is intended that all matter contained in the above description or shown in the accompanying drawings shall be interpreted as illustrative, and not in a limiting sense.

It is also to be understood that the language used in the following claims is intended to cover all the generic and specific features of novelty of the invention herein described and all statements of scope thereof which as a matter of language might be said to fall therebetween.

Having thus described my invention, I declare that what I claim as new and desire to secure by Letters Patent, is,—

1. A device of the class described comprising in combination a car body, a member reciprocatorily mounted thereon, an air hose depending from said body, a flexible connection interposed between the free end of said hose and said member adapted to be engaged by the latter during a predetermined reciprocation thereof and adapted to be automatically disengaged therefrom at the end of said reciprocation.

2. A device of the class described comprising in combination a car body, an air hose extending therefrom, and means mounted on said car body adapted to be manually operated to elevate the free end of said hose for the purpose of disconnecting it from its companion and then automatically drop said hose.

3. A device of the class described comprising in combination a car body, an air hose depending therefrom, a valve controlling the flow of air through said hose, and means carried by said car body flexibly connected to said air hose adapted to elevate the free end of said hose under a predetermined movement, said means being linked to said valve to simultaneously close the same.

4. A device of the class described comprising in combination a car body, an air hose having an automatic coupling at its free end depending therefrom, and manually operable means flexibly connected to said air hose adapted to elevate the free end of said hose to uncouple it from its companion under a predetermined movement and adapted by a continued movement to permit the return of said end to its normal position for the purpose of enabling it to be again coupled.

5. A device of the class described comprising in combination a car body, an air hose depending therefrom, a flexible connection secured to the free end of said hose, and means comprising a reciprocatory member and a shoe adapted to be engaged thereby for elevating the free end of said hose through the instrumentality of said connection.

6. A device of the class described comprising in combination a car body, an air hose depending therefrom, a reciprocatory member adapted to be manually actuated from either side of said car, a shoe having a limited movement relatively to said member, and means interposed between the free end of said hose and said shoe whereby the free end of said hose may be raised or lowered at will.

7. A device of the class described comprising in combination a car body, an air hose depending therefrom, a manually operable means carried by said car body, and a flexible connection extending from the free end of said hose, a shoe secured to said connection adapted to be engaged by the aforesaid means to elevate said hose, and a trip adapted to disengage said shoe to permit the return of said hose.

8. A device of the class described comprising in combination a car body, a member carried thereby adapted to have a reciprocatory movement, said member being provided with handles at the sides of the car adapting it for manual actuation, a shoe adapted to be engaged by said member, an air hose depending from said car body, and a flexible connection between said hose and said shoe whereby said hose may be elevated by a reciprocation of said member.

9. A device of the class described comprising in combination a car body, a member carried thereby adapted to be reciprocated, a shoe adapted to be engaged by said member, an air hose depending from said body, a valve positively connected to said member for controlling the flow of air through said hose, a flexible connection between said free end of said hose and said shoe whereby said end may be raised by the reciprocation of said member which actuates said shoe and effects a closure of said valve.

10. A device of the class described comprising in combination a car body, a member reciprocatorily mounted thereon and having handles at the sides of the car adapting it for being manually actuated, an air hose depending from said body, a shoe carried by said member, a flexible connection interposed between the free end of said hose and said shoe, said shoe adapted to be engaged by the member during a predetermined reciprocation thereof to raise said hose and adapted to be automatically disengaged therefrom at the end of said reciprocation to drop said hose.

In testimony whereof, I affix my signature in the presence of two witnesses.

WALTER S. BOWNESS.

Witnesses:
GUSTAVE BEUTELSPACHER,
AUSTIN A. ALLEN.